United States Patent [19]

Mackay et al.

[11] 4,045,581

[45] Aug. 30, 1977

[54] LONG-LASTING MINT-FLAVORED CHEWING GUM

[75] Inventors: Donald A. M. Mackay, Pleasantville; Frank Witzel, Spring Valley, both of N.Y.; Basant K. Dwivedi, Hopatcong; Daniel Schoenholz, Basking Ridge, both of N.J.

[73] Assignee: Life Savers, Inc., New York, N.Y.

[21] Appl. No.: 695,487

[22] Filed: June 14, 1976

Related U.S. Application Data

[63] Continuation of Ser. No. 577,589, May 15, 1975, abandoned.

[51] Int. Cl.² .............................................. A23G 3/30
[52] U.S. Cl. ......................................... 426/3; 426/548
[58] Field of Search ........................................ 426/3-6

[56] References Cited

U.S. PATENT DOCUMENTS

| 3,262,784 | 7/1966 | Bucher ..................................... 426/5 |
| 3,795,744 | 3/1974 | Ojawa et al. ............................ 426/3 |

*Primary Examiner*—Jeanette M. Hunter
*Attorney, Agent, or Firm*—Lawrence S. Levinson; Merle J. Smith; Burton Rodney

[57] ABSTRACT

A mint-flavored chewing gum which contains a water-insoluble gum base, sugars, flavoring and the free acid form of saccharin, in particulate form, dispersed in the insoluble gum base. The particulate artificial sweetener, undergoes controlled release from the gum base for relatively long periods, for example, for 30 minutes or more, at a concentration below the bitter threshold, so that the chewing gum delivers a sweet taste during such time unaccompanied by a metallic or bitter aftertaste.

5 Claims, No Drawings

LONG-LASTING MINT-FLAVORED CHEWING GUM

This is a continuation, of application Ser. No. 577,589, filed May 15, 1975, now abandoned.

FIELD OF THE INVENTION

The present invention relates to a long lasting mint-flavored chewing gum having particulate artificial sweetener, such as poorly water-soluble saccharin, that is in its free acid form, dispersed in the gum base portion thereof.

BACKGROUND OF THE INVENTION

Conventional chewing gum generally includes gum base, flavoring and various sugars and/or artificial sweeteners such as a water-soluble form of saccharin, for example, sodium or calcium saccharin. Such gum initially provides a desirable strong sweet taste which declines rapidly during the first three to five minutes of chewing to a very slight perceptible level of sweetness. The result is that after above five minutes of chewing all that remains in the mouth is an essentially tasteless wad which provides little in the way of aroma or sweetness. Furthermore, chewing gum which depends upon the water-soluble forms of saccharin for its sweetness exhibits an undesirably strong sweet taste initially accompanied by an objectionable medicinal and/or bitter aftertaste. Accordingly, there clearly is a need and long felt want for a chewing gum which possesses longlasting sweetness and aroma without the undesirable medicinal and bitter after-taste which normally accompanies chewing of gum sweetened by the soluble saccharins.

DETAILED DESCRIPTION OF THE INVENTION

It has now been found that the sweet taste of mint-flavored chewing gum can be prolonged by incorporating a solid artificial sweetener in particulate form, preferably a poorly water-soluble form of saccharin, in the gum base during the preparation of the gum, the artificial sweetener being employed in the form of a fine powder having an average particle size of below about 150 microns. The particulate artificial sweetener is substantially retained in the gum base and during chewing undergoes slow and controlled release into the saliva.

It is well known that fine pulverization of crystals of even poorly soluble materials or slowly dissolving materials of even good solubility increases surface area thereof, which, in turn, increases solubility rate. However, it has been surprisingly and unexpectedly found that finely divided artificial sweeteners, such as finely powdered free saccharin acid, when incorporated into chewing gum base does just the opposite; the extraction rate of such sweetener from the gum base during chewing is reduced with decreasing particle size so that the sweet taste of the gum is prolonged. The reasons for this effect is believed to be that at the finer particle size, the sweetener is more completely protected from contact with saliva by the gum base. This results in controlled release of sweetener from the gum base.

Poorly water-soluble saccharin, such as the free acid form, is quite bitter and has been found to exhibit a bitterness threshold as a function of concentration in the saliva. Surprisingly, it has been discovered that when such saccharin in finely divided form is incorporated in chewing gum, its bitterness is reduced; this is indeed surprising since one would expect a higher concentration of dissolved saccharin as a result of the higher solution rate due to the increased surface area of the finer particle size. Notwithstanding its larger surface area, it appears that at the finer particle size the saccharin is more completely protected from contact with saliva by the gum base so that controlled release of dissolved saccharin below the bitterness threshold is obtained. Furthermore, the presence of saccharin in the gum base, in the form described above, has also been found to enhance the aroma of many mint flavors.

A further feature of the present invention comprises a mint flavored chewing gum having the particular artificial sweetener incorporated in the gum base, and an additional sweetener, such as a sugar, a water-soluble saccharin salt or other synthetic water-soluble sweetener.

In yet another aspect of the present invention, a method is provided for forming a long-lasting flavored gum, which method includes the steps of admixing melted gum base with corn syrup at a temperature ranging from about 180° to about 210° F, to form a base-syrup mix, admixing the base-syrup mix with a particulate artificial sweetener, preferably poorly water-soluble saccharin, at a temperature below 250° F so as to inhibit formation of soluble saccharin salts, and thereafter admixing the above mix with one or more water-soluble sweeteners and mint flavor oils. The resulting mix is then formed into sticks or tablets of chewing gum employing conventional techniques.

By following the above procedure, the particulate poorly water-soluble artificial sweetener will be incorporated and retained in the gum base and will undergo controlled release in the mouth for periods of up to 30 minutes or more to provide concentrations of the sweetener, such as the saccharin, below the bitter threshold thereof but in sufficient amounts to provide a pleasant sweet taste.

The particulate artificial sweeteners suitable for use herein may comprise sweeteners including poorly water-soluble as well as water-soluble forms such as the free acid form of saccharin, sweet-tasting polyols, such as sorbitol and mannitol, sodium saccharin, calcium saccharin, dihydrochalcones, glycyrrhizin, glycyrrhizic acid ammonium salt, L-aspartyl-L-phenylalanine methyl ester, as well as *Stevia rebaudiana* (Stevioside), *Richardella dulcifica* (Miracle Berry), *Dioscoreophyllum cumminsii* (Serendipity Berry), cyclamates, and the like, or mixtures of any two or more of the above, with the free acid form of saccharin being preferred.

The particulare artificial sweetener will be present in the chewing gum in amounts ranging from about 0.05% to about 0.5% by weight of the chewing gum and preferably from about 0.1% to about 0.3% by weight of the chewing gum. Moreover, it is essential that the artificial sweetener be in particulate form so that it may be readily mixed into the melted gum base and retained therein to undergo controlled release in the mouth. Accordingly, the particulate sweetener will generally have a particle size below about 150 microns and preferably below about 100 microns. Use of free saccharin acid of the above-mentioned particle size will also reduce the bitter aftertaste associated therewith.

As indicated above, the chewing gum of the invention will also include gum base in an amount ranging from about 10 to about 50% and preferably from about 15 to about 30% by weight of the chewing gum composition.

In general, the gum base is prepared by heating and blending various ingredients, such as, natural gums, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as, butadiene-styrene polymer, isobutylene-isoprene copolymer, petroleum wax, polyethylene, polyisobutylene, polyvinylacetate, etc., plasticizers, such as, lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pats. Nos. 3,052,552 and 2,197,719. Typical gum base compositions are the following:

| Base I | Parts by Weight |
|---|---|
| Ester gum | 88 |
| Rubber latex solids | 10 |
| Lecithin | 2 |
| Base II | |
| Chicle | 30 |
| Jelutong | 60 |
| Gutta soh | 8.5 |
| Lecithin | 2 |
| Base III | |
| Partially oxidized chicle | 98 |
| Lecithin | 2 |
| Base IV | |
| Jelutong (dry) | 80 |
| Gutta siak | 18 |
| Lecithin | 2 |

The chewing gum of the invention will also include a flavoring in an amount ranging from about 0.3 to about 1.5% by weight and preferably from about 0.8 to about 1.2% by weight of the final gum product. The flavoring may comprise oils derived from plants, leaves, flowers, etc. Representative flavor oils of this type include essential oils such as peppermint oil, spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors may also be incorporated in the chewing gum of the invention with or without conventional preservatives.

The chewing gum of the invention will optionally, but preferably, include a water-soluble sweetener in addition to the particulate artificial sweetener, the water-soluble sweetener being present in an amount ranging from about 90 to about 0.05% by weight, preferably from about 90 to about 40% by weight and more preferably from about 85 to about 70% by weight of the final product to provide an initial burst of sweetness. Such water-soluble sweeteners may include one or more sugars or sugar-containing material, for example, monosaccharides, disaccharides and polysaccharides, some examples of which follow:

A. Monosaccharides of 5 or 6 carbon atoms — arabinose, xylose, ribose, glucose, mannose, galatose, fructose, or sorbose or mixtues of two or more of the foregoing monosaccharides.

B. Disaccharides — sucrose such as cane or beet sugar, lactose, maltose or cellobiose; and C. Polysaccharides — partially hydrolyzed starch, dextrin or corn syrup solids.

Furthermore, any of the water-soluble artificial or natural sweeteners set out hereinbefore may be present together with the particulate artificial sweetener.

Generally, in forming a preferred embodiment of the chewing gum of the invention, the poorly water-soluble saccharin will be employed in a weight ratio to the water-soluble sweetener within the range of from about 0.00056:1 to about 0.0125:1 and preferably within the range of from about 0.0012:1 to about 0.004:1.

The chewing gum of the invention may also contain softeners, fillers, plasticizers, emulsifiers, F.D.&C. coloring agents, and other conventional chewing gum additives as will be apparent to those skilled in the art.

It will be appreciated that the particulate artificial sweetener, such as the free saccharin acid will be incorporated into the oil phase or gum base itself and will provide long lasting sweetness, whereas the water-soluble sweeteners and flavors will comprise the water-soluble portion of the chewing gum and will provide the initial burst of sweetness and flavor.

The following Examples illustrate preferred embodiments of the present invention without, however, limiting the same thereto. All temperatures are expressed in ° F.

EXAMPLE 1

A long-lasting peppermint flavor chewing gum is prepared from the following ingredients:

| | Parts by Weight |
|---|---|
| Gum base | 20 |
| Corn Syrup, 44° Be' | 17 |
| Powdered free saccharin acid (pulverized to pass through a U.S. 140 mesh screen) | 0.2 |
| Powdered Sugar (sucrose) | 50 |
| Dextrose | 10 |
| Peppermint oil | 1 |
| Lecithin | 0.2 |

The gum base is melted (temperature 270°) and placed in a standard dough mixer kettle equipped with sigma blades. The corn syrup and lecithin are added and mixed for 2 minutes at 200°. At the time the mix is folding well, powered free saccharin is added and the mixture is mixed another 3 minutes at 200°. Thereafter, the sucrose, dextrose and flavor oil are added during which time the mixture is mixed for 5 minutes. The gum is then discharged from the kettle, cut into 25 lb. loaves and allowed to cool to 90°-120° F. It is then rolled to a thickness of 0.178 cm on a standard Gimpel machine and scored into strips 7.26 cm wide and 41.9 cm long, and cooled for 12–18 hours.

The chewing gum product obtained is found to have a pleasant sweet taste for up to 30 minutes and more without the bitter aftertaste normally associated with free saccharin acid.

EXAMPLES 2 to 5

Following the procedure of Example 1, four peppermint chewing gum formulations in accordance with the present invention and one control formulation having the following compositions are prepared:

TABLE 1

| | PEPPERMINT CHEWING GUM | | | | |
|---|---|---|---|---|---|
| | Parts by Weight | | | | |
| Example No. | Control A | 2 | 3 | 4 | 5 |
| Ingredients | | | | | |
| Base | 20 | 20 | 20 | 20 | 20 |
| Sucrose | 60.8 | 50.6 | 25.5 | 25.6 | 25.55 |
| Dextrose | — | — | 25 | — | — |
| Sorbitol | — | 10 | 10 | 10 | 10 |

TABLE 1-continued

PEPPERMINT CHEWING GUM

| | Parts by Weight | | | | |
|---|---|---|---|---|---|
| Example No. | Control A | 2 | 3 | 4 | 5 |
| Ingredients | | | | | |
| Anhydrous Dextrose | — | — | — | 25 | 25 |
| Corn Syrup | 18 | 18 | 18 | 18 | 18 |
| Lecithin | 0.2 | 0.2 | 0.2 | 0.2 | 0.2 |
| Peppermint Oil | 1 | 1 | 1 | 1 | 1 |
| Free Saccharin Acid (micronized - passes through a U.S. 140 screen) | — | 0.2 | 0.3 | 0.2 | 0.25 |

In preparing the above compositions, the sucrose, dextrose, anhydrous dextrose and sorbitol (where present) are added at approximately the same time.

In order to evaluate the control A composition containing no free saccharin against the Examples 2-5 compositions of the invention, a trained sensory panel tested the above compositions for taste flavor and overall quality, as defined below:

Taste: This attribute is used in reference to sweet, sour, salty, bitter, metallic, cool and hot (burning) sensations perceived by the tongue.

Flavor: It refers to a combination of taste and odor sensations as perceived by the tongue and olfactory cells.

Overall quality: The overall desirability or undesirability of the product as judged by the sensory panel members using their own judgment.

The results obtained are set out in Table 2 below:

TABLE 2
EVALUATION OF PEPPERMINT FLAVORED CHEWING GUM CONTAINING FREE-SACCHARIN

SCALE:
- = dislike extremely.
- 3 = dislike moderately.
- 5 = neither like nor dislike.
- 7 = like moderately.
- 9 = like extremely.

| | | SENSORY SCORE | | | | |
|---|---|---|---|---|---|---|
| Example No. | | Control A | 2 | 3 | 4 | 5 |
| Attribute | Time (minutes) | | | | | |
| TASTE | 2 | 7.2 | 7.2 | 6.2 | 7.2 | 7.2 |
| | 4 | 5.6 | 6.4 | 5.6 | 6.8 | 6.6 |
| | 6 | 5.2 | 5.8 | 5.0 | 6.4 | 6.2 |
| | 10 | 4.2 | 5.4 | 4.8 | 5.8 | 5.6 |
| | 15 | 3.6 | 5.2 | 4.8 | 5.4 | 5.4 |
| | 20 | 3.6 | 5.2 | 5.0 | 5.6 | 5.4 |
| | 30 | 3.2 | 5.0 | 5.0 | 5.2 | 5.2 |
| FLAVOR | 2 | 7.2 | 7.2 | 6.0 | 7.2 | 7.2 |
| | 4 | 6.0 | 6.4 | 5.8 | 6.8 | 7.0 |
| | 6 | 5.4 | 6.0 | 5.6 | 6.2 | 6.8 |
| | 10 | 4.4 | 5.8 | 5.0 | 6.2 | 6.0 |
| | 15 | 3.6 | 5.8 | 5.2 | 5.8 | 5.4 |
| | 20 | 3.6 | 5.6 | 5.4 | 5.8 | 5.2 |
| | 30 | 3.4 | 5.4 | 5.4 | 5.2 | 5.2 |
| OVERALL QUALITY | 2 | 7.4 | 7.4 | 6.4 | 7.0 | 7.2 |
| | 4 | 6.4 | 7.0 | 6.0 | 6.8 | 7.0 |
| | 6 | 5.8 | 6.4 | 5.6 | 6.4 | 7.0 |
| | 10 | 4.6 | 5.8 | 5.2 | 6.2 | 6.6 |
| | 15 | 4.4 | 5.8 | 5.2 | 5. | 6.0 |
| | 20 | 4.4 | 5.8 | 5.4 | 6.0 | 6.0 |
| | 30 | 4.0 | 5.6 | 5.2 | 5.8 | 5.8 |

The results set out in Table 2 clearly demonstrate that the taste, flavor and overall quality of the chewing gum of the invention (Examples 2 to 5) are materially and significantly superior to the control A formulation which does not include the free saccharin acid dispersed in the gum base.

EXAMPLE 6

A long-lasting spearmint flavor chewing gum is prepared from the following ingredients:

| | Parts by Weight |
|---|---|
| Gum Base | 20 |
| Sugar (sucrose) | 52 |
| Corn Syrup 44 Be' | 17 |
| Dextrose | 10 |
| Lecithin | 0.2 |
| Free saccharin (powdered - passes through a 140 U.S. mesh screen) | 0.2 |
| Spearmint oil | 0.6 |

The gum base is melted (temperature 270°) and placed in a standard dough mixer kettle equipped with sigma blades. The corn syrup and lecithin are added and mixed for 2 minutes at 200°. At the time the mix is folding well, powered free saccharin and flavor oil are mixed for 1 minute at 200°. Thereafter, the sucrose, dextrose and coloring agents are added and blended with the above mixture for 5 minutes at 160°. The resulting gum is discharged from the kettle and formed into gum sticks as described in Example 1.

The chewing gum product obtained is found to have a pleasant sweet taste for up to 30 minutes and more without the bitter aftertaste normally associated with free saccharin acid.

EXAMPLE 7

Following the procedure of Example 6, a spearmint chewing gum formulation in accordance with the present invention and one control formulation having the following composition are prepared:

TABLE 3
SPEARMINT CHEWING GUM

| | Parts by Weight | |
|---|---|---|
| Example No. | Control B | 7 |
| Ingredients | | |
| Gum Base | 20 | 20 |
| Sucrose | 38 | 38 |
| Dextrose | 10 | 10 |
| Corn Syrup | 17 | 17 |
| Lecithin | 0.2 | 0.2 |
| Sorbitol | 10 | 10 |
| Free Saccharin Acid (passed through a 140 U.S. mesh screen) | — | 0.2 |
| Spearmint oil | 0.6 | 0.6 |

In preparing the above compositions, the sucrose, dextrose and sorbitol are added at approximately the same time.

In order to evaluate the control B composition containing no free saccharin against the Example 7 composition of the invention, a trained sensory panel tested the above compositions for sweetness, coolness, spearmint aroma, and overall quality. The results obtained are set out in Table 4 below

TABLE 4
EVALUATION OF SPEARMINT FLAVORED CHEWING GUM CONTAINING INSOLUBLE FORM OF SACCHARIN

| | | Sensory Score | |
|---|---|---|---|
| Example No. | | Control B | 7 |
| Attributes | Time (Min.) | | |
| Sweetness[1] | 1 | 6.0 | 6.4 |
| | 3 | 4.2 | 4.2 |
| | 5 | 2.4 | 3.0 |
| | 10 | 1.0 | 2.4 |
| | 15 | 1.0 | 2.2 |

TABLE 4-continued
EVALUATION OF SPEARMINT FLAVORED CHEWING GUM CONTAINING INSOLUBLE FORM OF SACCHARIN

| Example No. | | Sensory Score | |
|---|---|---|---|
| Attributes | Time (Min.) | Control B | 7 |
| | 20 | 1.0 | 1.8 |
| | 30 | 1.0 | 1.8 |
| | 1 | 4.6 | 4.6 |
| | 3 | 3.4 | 3.4 |
| | 5 | 2.4 | 2.6 |
| Coolness[1] | 10 | 1.2 | 2.4 |
| | 15 | 1.2 | 2.6 |
| | 20 | 1.2 | 2.6 |
| | 30 | 1.2 | 2.2 |
| | 1 | 5.2 | 6.2 |
| | 3 | 3.8 | 4.4 |
| | 5 | 2.6 | 3.6 |
| Spearmint[1] | 10 | 1.8 | 3.2 |
| Aroma | 15 | 1.4 | 3.0 |
| | 20 | 1.2 | 2.6 |
| | 30 | 1.2 | 2.6 |
| | 1 | 6.6 | 7.2 |
| | 3 | 5.8 | 6.2 |
| | 5 | 5.2 | 5.6 |
| Overall[2] | 10 | 4.0 | 5.2 |
| Quality | 15 | 4.0 | 5.4 |
| | 20 | 3.4 | 5.4 |
| | 30 | 3.4 | 5.4 |

Sensory Scales
1. Sweetness, coolness, spearmint aroma:
   1 = imperceptible,
   3 = moderately perceptible
   5 = perceptible
   7 = moderately pronounced
   9 = very pronounced 2. Overall Quality:
   1 = very undesirable
   3 = moderately undesirable
   5 = neutral
   7 = moderately desirable
   9 = very desirable The results set out in Table 4 clearly demonstrate that the sweetness, coolness, aroma and overall quality of the chewing gum of the invention (Examples 7) are materially and significantly superior to the control B formulation which does not include the free saccharin acid dispersed in the gum base.

What is claimed is:

1. A flavored chewing gum having a prolonged sweet taste comprising gum base, the free acid form of saccharin dispersed in said gum base, and flavoring, said free acid form of saccharin being present in an amount of from about 0.05 to about 0.5% by weight of the chewing gum and further including from about 0.05 to about 90% by weight of one or more water-soluble sweetening agents at least one of which is sucrose.

2. The flavored chewing gum as defined in claim 1 wherein said free acid form of saccharin is present in an amount within the range of from about 0.1 to about 0.3% by weight.

3. The flavored chewing gum as defined in claim 1 wherein said flavoring comprises essential or synthetic coils.

4. The flavored chewing gum as defined in claim 1 wherein the free acid form of saccharin is employed in a weight ratio to the water-soluble sweetener within the range of from about 0.00056:1 to about 0.0125:1.

5. A method for forming a flavored chewing gum as defined in claim 1, which comprises admixing melted gum base with a plasticizer or syrup at a temperature ranging from about 180° to about 210° F to form a base-syrup mix, and at a time the mix is folding well, admixing the base-syrup mix with said free saccharin acid at a temperature below about 250° F so as to inhibit formation of soluble saccharin salts and to form a continuous mass, admixing the above mix with sucrose and thereafter forming the above mix into sticks or tablets.

* * * * *